(12) United States Patent
Hall et al.

(10) Patent No.: US 7,057,556 B2
(45) Date of Patent: Jun. 6, 2006

(54) METHOD AND APPARATUS FOR GEOLOCATING A WIRELESS COMMUNICATIONS DEVICE

(76) Inventors: Christopher J. Hall, 424 Bridgetown Ct., Satellite Beach, FL (US) 32937; Clay S. Turner, 130 Jade Cove Dr., Roswell, GA (US) 30075; Jimmy C. Ray, 3355 Juanita Dr., Denison, TX (US) 75020

( * ) Notice: Subject to any disclaimer, the term of this patent is extended or adjusted under 35 U.S.C. 154(b) by 0 days.

(21) Appl. No.: 11/108,216

(22) Filed: Apr. 18, 2005

(65) Prior Publication Data

US 2005/0184907 A1   Aug. 25, 2005

Related U.S. Application Data

(63) Continuation of application No. 10/292,917, filed on Nov. 12, 2002, now Pat. No. 6,891,500.

(60) Provisional application No. 60/419,366, filed on Oct. 18, 2002, provisional application No. 60/365,104, filed on Mar. 18, 2002.

(51) Int. Cl.
*G01S 3/02* (2006.01)
*H04Q 7/20* (2006.01)

(52) U.S. Cl. ............... 342/387; 342/451; 342/465; 455/456.5

(58) Field of Classification Search ............ 342/387, 342/451, 463, 465, 442; 455/456.5
See application file for complete search history.

(56) References Cited

U.S. PATENT DOCUMENTS

| | | | |
|---|---|---|---|
| 4,604,717 A | * | 8/1986 | Kaplan ............ 342/387 |
| 4,728,959 A | | 3/1988 | Maloney et al. |
| 5,043,736 A | | 8/1991 | Darnell et al. |
| 5,317,323 A | | 5/1994 | Kennedy et al. |
| 5,327,144 A | | 7/1994 | Stilp et al. |
| 5,396,625 A | | 3/1995 | Parkes |
| 5,485,631 A | | 1/1996 | Bruckert |
| 5,512,908 A | * | 4/1996 | Herrick ............ 342/387 |
| 5,519,760 A | | 5/1996 | Borkowski et al. |
| 5,526,001 A | | 6/1996 | Rose et al. |
| 5,537,460 A | | 7/1996 | Holliday, Jr. et al. |
| 5,570,412 A | | 10/1996 | LeBlanc |
| 5,572,204 A | | 11/1996 | Timm et al. |

(Continued)

*Primary Examiner*—Thomas H. Tarcza
*Assistant Examiner*—Fred H. Mull
(74) *Attorney, Agent, or Firm*—John L. DeAngelis, Jr.; Beusse Wolter Sanks Mora & Maire, P.A.

(57) ABSTRACT

The time difference of arrival for a signal received at two or more receiving sites as transmitted from a wireless communications device, is determined by a frequency domain technique. The constituent frequencies of the signals received at the two or more receiving sites are determined, including the phase, or a value representative of the phase, of each frequency component. The phase values for the same frequency are subtracted to yield a phase difference values as a function of frequency. The slope of the function represents the time difference of arrival for the wireless communications device signal as received at the two receiving sites. To determine the mobile location based on the determined time difference of arrival values, a seed or initial location is first assumed for the wireless communications device and the distance difference of arrival (the time difference of arrival multiplied by the speed of light) is calculated. The calculated time difference of arrival is then used to adjust the distance difference of arrival by continuously iterating the position of the wireless communications device until the calculated distance of arrival and the calculated time difference of arrival (as multiplied by the speed of light) are within a predetermined margin.

39 Claims, 4 Drawing Sheets

U.S. PATENT DOCUMENTS

| | | |
|---|---|---|
| 5,592,180 A | 1/1997 | Yokev et al. |
| 5,594,425 A | 1/1997 | Ladner et al. |
| 5,596,330 A | 1/1997 | Yokev et al. |
| 5,608,410 A | 3/1997 | Stilp et al. |
| 5,613,217 A | 3/1997 | Hagstrom et al. |
| 5,623,484 A | 4/1997 | Muszynski |
| 5,625,668 A | 4/1997 | Loomis et al. |
| 5,630,206 A | 5/1997 | Urban et al. |
| 5,644,254 A | 7/1997 | Boudry |
| 5,686,910 A | 11/1997 | Timm et al. |
| 5,687,215 A | 11/1997 | Timm et al. |
| 5,719,584 A | 2/1998 | Otto |
| 5,732,354 A | 3/1998 | MacDonald |
| 5,781,101 A | 7/1998 | Stephen et al. |
| 5,873,040 A | 2/1999 | Dunn et al. |
| 5,914,687 A | 6/1999 | Rose |
| 5,920,278 A * | 7/1999 | Tyler et al. ............... 342/463 |
| 5,959,580 A | 9/1999 | Maloney et al. |
| 5,970,413 A | 10/1999 | Gilhousen |
| 6,018,312 A * | 1/2000 | Haworth ............... 342/465 |
| 6,047,192 A | 4/2000 | Maloney et al. |
| 6,091,362 A * | 7/2000 | Stilp et al. ............... 342/465 |
| 6,233,459 B1 | 5/2001 | Sullivan et al. |
| 6,285,319 B1 | 9/2001 | Rose |
| 6,424,837 B1 | 7/2002 | Hall et al. |

* cited by examiner

METHOD AND APPARATUS FOR GEOLOCATING A WIRELESS COMMUNICATIONS DEVICE

CROSS REFERENCE TO RELATED APPLICATIONS

The present application is a continuing application claiming the benefit of the application filed on Nov. 12, 2002, and assigned application Ser. No. 10/292,917 now U.S. Pat. No. 6,891,500.

This patent application claims the benefit of provisional patent application No. 60/365,104 filed on Mar. 18, 2002, entitled An Alternative Solution to the Problem of Geolocating a Portable Radio Transmitter, and the provisional application No. 60/419,366, filed on Oct. 18, 2002, entitled An Alternate Solution to the Problem of Geolocating a Portable Radio Transmitter.

FIELD OF THE INVENTION

This invention relates to methods and apparatuses for determining a geographic position of a portable or mobile wireless communications device, including a mobile cellular telephone, a personal communications device or a location tracking device (referred to generally as a wireless communications device), and in particular to such methods and apparatus using a frequency domain analysis of the received signal to determine the geographic position.

BACKGROUND OF THE INVENTION

It is desired to provide emergency service to users of wireless communications devices, through a "911" type service (referred to as E911 or enhanced 911 service). The familiar "911" telephone number is used nationally as an emergency landline telephone number. When making a 911 call, a geolocating process is activated, and once the calling party's location has been determined, emergency personnel can be dispatched to the site. The effectiveness of emergency services depends on the ability of the emergency personnel to locate and deliver emergency services at the caller's site without undue delay. Given the widespread growth of mobile telephone use, the U.S. government has recently promulgated regulations requiring that providers of cellular telephone service provide a geolocating capability for E911 calls.

A problem with responding to a request for emergency assistance from a wireless communications device is the inability to use the calling telephone number as an aid to position location. Also, a wireless communications device user may be in unfamiliar territory and therefore unable to provide location information directly to the emergency services personnel. This lack of information regarding the caller's location hampers and delays efforts to provide emergency assistance to the caller.

A mobile cellular telephone system comprises a plurality of cells, each having a transmitting/receiving base station for sending and receiving signals from wireless communications devices, commonly referred to as cellular telephones, operating within the cell on pre-assigned frequencies. As the cell phone user moves into the coverage area of an adjacent cell, the cell phone signal is handed off from the base station of the original cell to the base station of the adjacent cell. The geographic size and shape of each cell coverage area in a cellular telephone network is determined by such factors as the beam shape and gain of the base station transmit/receive antennas, transmitter power levels, call handoff parameters and the surrounding terrain. In open flat country, cell coverage areas are substantially circular with overlapping borders. Where buildings or uneven topography block radio-frequency transmissions, the cell coverage areas may be quite irregular in shape. The cell coverage areas are designed to be smaller in urban areas to allow for closer frequency reuse, i.e., to allow more users in a given area using the same limited number of channels available to the cellular service provider.

A cellular telephone call is handed off from one cell base station to another base station based on the received signal strength or another signal quality metric determined at the base stations and/or at the cellular telephone, with the call being routed through the base station cell receiving or providing the best signal. In many areas, a number of cell sites may be capable of receiving calls from a cellular telephone, although the call is typically carried by the base station providing the highest quality service.

According to the prior art, when it is desired to determine the position of a wireless communications device in a cellular telephone system, for example, in response to a 911 call initiated from the wireless communications device, a two step process may be employed. First, the time difference of arrival (TDOA) of a signal sent from the wireless communications device and received at different base stations is determined. Second, the TDOA data and the known location (s) of the base station receiving sites are used to determine the sender's relative position.

Note that the time when the transmission of a signal begins is unknown. However, to determine the location of the wireless communications device, it is necessary to calculate the difference in the arrival times for the same signal at the several receiving sites. These time differences correspond to differences in distance between the wireless communications device and the receiving base stations, since all signals travel at the speed of light. The distance between the wireless communications device and the receiving base station is given by $d=ct$, where c is the speed of light (299,792,458 m/sec in vacuo), t is the transmission time and d is the distance between the wireless communications device and the receiving base station. The speed in air is essentially the same as in a vacuum. With the TDOA approach, a signal received at n receiving sites (or base stations as applied to a cellular telephone network) yields $n(n-1)/2$ pairs of time difference of arrival values that can be used to determine the location of the wireless communications device.

According to the prior art, the time difference of arrival of a signal received at two receiving sites is calculated in the time domain by determining the cross correlation of the two received signals. The correlation is carried out directly according to the cross-correlation integral or by the discrete time equivalent of the cross-correlation integral. Using these equivalent methods, the cross-correlation function is generated. This function represents the time offset between receipt of the signal at the two receiving sites, with the peak value of the function identifying the minimum time offset, or the highest correlation between the two signals. Thus the time difference of arrival of the signal at the two receiving base stations equals the time offset at the function peak. This is the conventional prior art time domain approach to geolocating a wireless communications device.

It is known that the signal received at each of the base stations is nearly identical, with differences typically caused by non-identical noise characteristics of the signal paths between the wireless communications device and the receiving site, multipath effects, fading and non-identical matched filters at the receiving sites. These signal differences can impact the results obtained from the cross-correlation technique described above, making the function peak difficult to locate or shifting the peak from the true TDOA value.

As illustrated in FIG. 1, according to the prior art time-difference-of-arrival technique, a wireless communications device 2 transmits a signal received at plural receiving stations 4. In the example system of FIG. 1, the plural receiving stations 4 comprise RS1, RS2 and RS3. The receiving stations RS1, RS2 and RS3 have a common time reference, such as a signal received from a high precision clock on a geosynchronous satellite, a signal received from a central processing site (not shown), or highly stable internal clocks (which can be periodically updated or synchronized to an external time reference). When an identifiable segment of the signal from the wireless communications device 2 is received, the time of receipt is ascertained at the receiving stations RS1, RS2 and RS3 using conventional techniques employing the aforementioned time reference. Information regarding the received signal, including the time of arrival of the identifiable segment, is sent from the receiving stations RS1, RS2 and RS3 to a central processing site located at one of the receiving stations RS1, RS2 and RS3 or at separate site (not shown).

At the central processing site, the signal time-of-arrival information at the receiving stations RS1, RS2, and RS3 is used to calculate the time difference of arrival of the signals. According to the prior art, the TDOA is determined by the cross-correlation function as described above. If three receiving stations report the time of arrival, three time difference values are calculated. Knowing the location of the receiving: stations RS1, RS2 and RS3 and the propagation speed of the signal transmitted from the wireless communications device 2, (i. e., the speed of light) the central processing site can determine the geolocation of the wireless communications device.

Generally, the time difference of arrival of the same signal at any two receiving stations is a constant (ignoring motion of the wireless communications device) and assuming flat terrain, yields a locus of points along a hyperbola. If the terrain is not flat, a hyperbola of rotation is the surface to be considered as it intersects the terrain. For example, with continued reference to FIG. 1, the possible locations of a wireless communications device transmitting a signal that arrived at receiving station RS1 at $t_1$ and arrived at receiving station RS2 at $t_2$ is defined by the locus of points comprising a hyperbola curve 6, where the curve is defined by $t_2-t_1=k_1$, where $k_1$ is a constant. With only two receiving stations using a TDOA method, it is generally not possible to determine a precise location for a target unit, but rather only a locus of points along a curve, such as the curve 6. Therefore, TDOA systems generally use at least three receiving stations to make a geolocation determination. For example, if the same signal is also received and time tagged by the third receiving station RS3, the central processing site computes two additional curves, based on the time difference of arrival of the signal at the three receiving sites taken in pairs. One such curve is determined by the time difference of arrival between receiving stations RS1 and RS3 (curve 7), and the other is determined by the time difference of arrival between receiving stations RS2 and RS3 (curve 8). The intersection of the curves 6, 7 and 8 is the geolocation of the wireless communications device 2.

It is known that in certain situations it may be possible to determine the location of the wireless communications device using the TDOA results from three receiving stations by calculating only two time difference of arrival values. The two generated hyperbolae will generally intersect at two points and thus the mobile location is not uniquely determinable. However, when the two points of intersection are overlaid with an area map showing various man-made and natural features, it may be possible to eliminate one of the two intersections as a possible mobile location. For example, if it is assumed that the wireless communications device is on a road, and only one of the two intersections occurs along a road, then the other potential location is eliminated from consideration. Alternatively, one of the receiving sites may be able to determine the sector of the azimuth plane (or more precisely the angle of arrival) from which the wireless communications device signal is received. When coupled with the two possible locations at the intersection of the two hyperbolae, this angle of arrival information allows for the selection of the correct location from the two possible locations.

As understood by those skilled in the art, the TDOA calculations may be adjusted for factors that affect the results, such as local terrain effects, time reference, etc.

Note that the prior art technique described above determines the TDOA between two signals received at spaced-apart receiving sites by performing time domain operations to first generate the cross-correlation function of the two received signals. The cross-correlation function represents the time offset between receipt of the two signals at their respective receiving sites. The peak value of the function identifies the minimum time offset, or the highest correlation of the two signals. Thus the time difference of arrival of the two signals at their respective base stations equals the time offset at the function peak.

To determine the cross-correlation function according to the prior art, the segment of both signals for which the TDOA is to be calculated must be transmitted to the central processing site, or at a minimum the segment of one received signal must be transmitted to the other receiving site for processing there. The cross-correlation function can be determined only by processing these received signal segments. Disadvantageously, there must be a relatively wideband transmission path between the various receiving sites, and the central receiving site, if applicable, to carry these signal segments and allow the calculation of the TDOA value in a relatively short period. Recall that in one embodiment the geolocation is being determined in response to an emergency (E911) call placed from the wireless communications device and thus time is of the essence in calculating the TDOA and then the caller's position.

Once the cross-correlation function is determined, it is necessary to find the function peak, which defines minimum time offset or the highest correlation of the two signals. This is typically carried out by sampling the cross-correlation function and comparing the sample values until the peak is found. In this search process, there can be some difficulty in accurately determining the peak's location because the peak is unlikely to fall directly on a time sample. Thus, if time difference of arrival values are to be determined more precisely than the sampling period, the cross-correlation function must be interpolated between sample periods to find the function peak. Alternatively, the cross-correlation function can be over sampled during the peak search process, but this is accomplished at the expense of increased computational overhead and time.

BRIEF SUMMARY OF THE INVENTION

According to the present invention, the location of the wireless communications device is determined by calculating the TDOA of a radio frequency (RF) or other electromagnetic signal (an optical signal for example) received at two or more spaced-apart receiving sites using frequency domain computational techniques, as compared with the prior art time-domain techniques. The TDOA value is determined by first transforming a segment of each received signal from the time domain to the frequency domain. The transformed signal segment can comprise, for example, a segment of the control signal that occurs at known intervals (registration, for instance) or that associated with a call initiation attempt, preceding the voice (or data) transmission between the wireless communications device and the receiving sites. In the frequency domain, the received signal comprises a plurality of frequency components, each having a magnitude and phase value. Figuratively, to find the TDOA the phase difference between the signals received at two (or more) receiving sites is plotted as a function of frequency. The result approximates a straight line. The line slope is directly proportional to the time shift between the two signals, or the time-difference of arrival. The y-axis intercept is the relative frequency error between the received signals.

The frequency domain approach of the present invention avoids certain disadvantages of the prior art time-based cross-correlation technique discussed above, and offers unique advantages, such as avoiding the computation time required to form the cross-correlation function and to then locate the function peak. The frequency domain approach also permits the use of frequency domain filtering to select only those frequency components having a relatively high signal-to-noise ratio for determining the phase versus frequency line, as described above, from which the TDOA is determined. Also, in one embodiment the TDOA frequency domain approach exploits the computational efficiency of the fast Fourier transform (FFT) to transform the time domain signal to the frequency domain.

The method of determining the TDOA according to the present invention is computationally simple and robust. Advantageously, the method can utilize the FFT algorithm since the calculations are done in the frequency domain. The robustness is further enhanced by two filtering processes. The first is the aforementioned frequency domain window filter wherein the high signal-to-noise components (or components selected based on a different signal quality metric) are selected for determining the line and the remaining components are either not considered or less heavily weighted. The second filter process is the regression analysis to find the best fit line, as will be discussed further below.

The techniques of the present invention can be employed in TDMA and FDMA cellular systems. Although the teachings can also be employed to determine the TDOA in a CDMA-based cellular system, conventional CDMA signal processing at the receiving site inherently determines the signal time of arrival, from which the time difference of arrival of a signal at two receiving sites can be easily determined.

As will be described below, a second aspect of the present invention relates to an iterative process to determine the location of the wireless communications device once the TDOA has been determined. This aspect is applicable to TDMA, FDMA, CDMA, trunking systems, and any communication system where the location of a wireless communications device must be determined from time difference of arrival information received at two or more receiving sites.

The methods of the present invention for locating a wireless communication device can also be employed for fleet vehicle tracking, non-emergency location services, etc. Thus for the purposes of the description herein, the "911 calls" may include non-emergency transmissions or any mobile registration actions that can be used to determine the location of the transmitting device.

BRIEF DESCRIPTION OF THE DRAWINGS

The foregoing and other features of the invention will be apparent from the following more particular description of the invention, as illustrated in the accompanying drawings, in which like reference characters refer to the same parts throughout the different figures. The drawings are not necessarily to scale, emphasis instead being placed upon illustrating the principles of the invention.

DETAILED DESCRIPTION OF THE INVENTION

Figure 1:
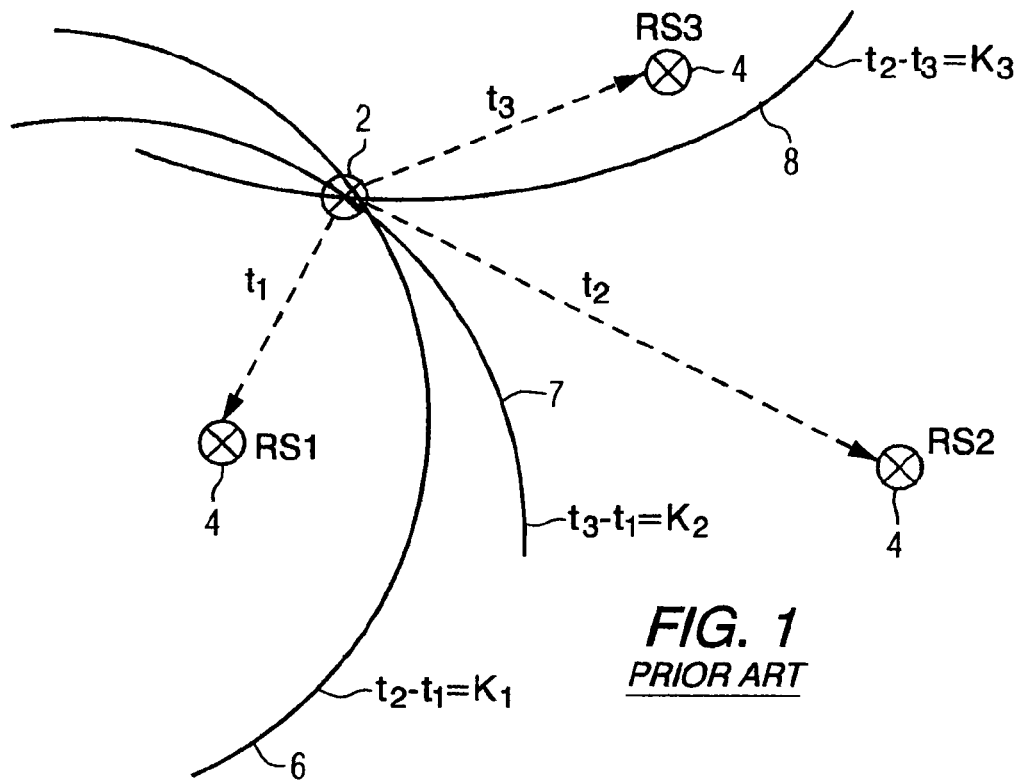
FIG. 1 is a schematic of a geographical area including receiving sites and a wireless communications device for determining location of the wireless communications device.

Before describing in detail the particular method and apparatus for locating wireless communications devices in accordance with the present invention, it should be observed that the present invention resides primarily in a novel combination of hardware elements and software elements related to a method and apparatus for locating wireless communications devices. Accordingly, the hardware and software elements have been represented by conventional elements in the drawings, showing only those specific details that are pertinent to the present invention, so as not to obscure the disclosure with structural details that will be readily apparent to those skilled in the art having the benefit of the description herein.

Figure 2:
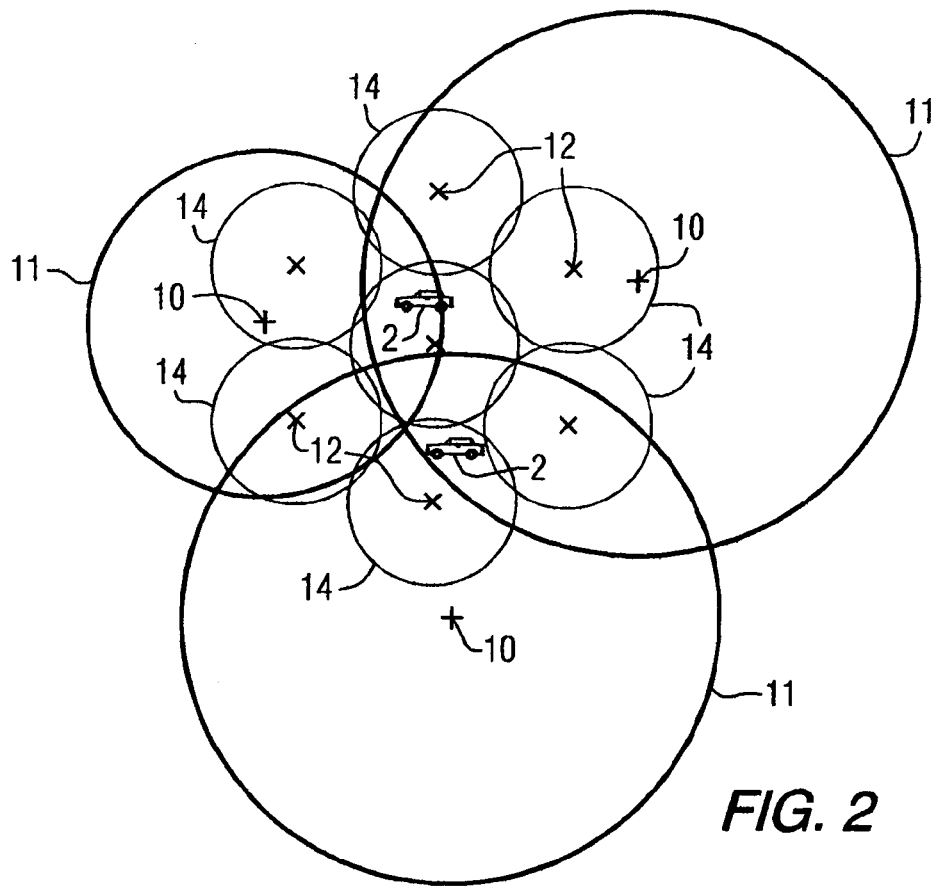
FIG. 2 is a map view of a geographical area including three monitoring sites and their respective radio coverage areas, within which are included several cellular base stations and a plurality of cellular wireless communications devices.

FIG. 2 shows a map view of a geographical area including three monitoring stations 10 at or near the center of monitoring regions 11, and a plurality of base stations (or receiving sites) 12 at or near the center of a cell coverage areas 14. The monitoring regions 11 and the cell coverage areas 14 are indicated by the circles shown in FIG. 2, although it is known that the circles are only useful expedients for defining these coverage areas, as the signal transmission and receiving capabilities of the monitoring stations 10 and the cell sites 14 are influenced by several factors and are never perfectly circular in nature. The monitoring stations 10 monitor may also monitor transmissions on the cellular system for determining operational parameters indicating the network health.

As shown in FIG. 2, the coverage areas 11 of the monitoring stations 10 are much larger than the coverage areas 14 of the base stations 12. Located on tall towers or other suitably elevated locations such as mountains, tall buildings, etc., the monitoring stations 10 may be located to receive RF transmissions from a number of base stations 12 and corresponding cells 14 to collect network performance data and/or, according to the teachings of the present invention, to obtain time of arrival information. See the commonly-owned U.S. Pat. No. 6,424,837 (Automated Testing for Cellular Telephone System Including Emergency Positioning) for details of the function and operation of the monitoring stations 10. Both the monitoring stations 10 and the base stations 12 receive transmissions from wireless communications devices 2 within their coverage areas 11 and 14 respectively. Thus signals received at either the monitoring stations 10 or the base stations 12, or a combination of both, can be analyzed to geolocate the wireless communications device 2.

A wireless communications device 2 (also referred to as a transmitting unit) includes a cellular telephone station, either mobile, portable, or hand-held, used by a person on foot or in a vehicle, including ground vehicles, marine vessels, and aircraft. Although the teachings of the present invention are described with reference to a cellular telephone system, the teachings are not limited to wireless communications devices operating under the protocols and spectrum regulations of the cellular telephone service. Instead, these teachings can be applied to determine the geolocation of any radio frequency transmitting device having a signal capable of being received by at least two receiving stations, including PCS (personal communications systems) devices, push-to-talk communications devices, and trunked radio system devices. The teachings of the present invention can also be applied to the geolocation of a portable transmitting device within a structure.

Most communications systems to which the teachings of the present invention can be applied, such as a trunked radio system or a cellular telephone system, employ brief control transmissions over a control channel prior to the sustained voice or data transmissions. These control channel transmissions can be used for geolocation without the necessity of monitoring all active voice channels and/or TDMA time slices within all the channels.

With continued reference to FIG. 2, the wireless communications device 2 placing a call is within range of several base stations 12. This is frequently true in urban areas, but in rural areas a signal from a wireless communications device 2 may be received at fewer base stations. A call from a wireless communications device 2 is carried by a particular base station 12 based on the signal strength (or other signal quality metrics). That is, the base station 12 providing the best signal quality handles the call from wireless communications device 2. As the wireless communications device 2 moves, the mobile signal is switched or "handed off" from one cellular base station to another based on one or more signal quality metrics of the received signal. Such a hand-off is automatic and so brief that a caller is usually unaware when it happens.

To locate the position of the wireless communications device 2, signals transmitted by the wireless communications device 2 are received at one or more receiving sites, including the base station(s) 12 serving the wireless communications device 2, other base stations 12 receiving the transmitted signal, and/or one or more of the monitoring stations 10. Although any transmitted signal received at multiple receiving sites can be used to perform the geolocation function, in one embodiment a "call access attempt," signal is preferred. As used herein, a call access attempt signal includes a call originating from the wireless communications device 2, a response from the wireless communications device 2 to an incoming call, or a registration signal transmitted by the wireless communications device 2 to a base station 12 for registering the device's presence in the coverage area 14. In the various embodiments of the present invention, detection of a call access attempt, such as a specific dialed number, e.g., 911, or the detection of a specific user identity number, initiates the process of determining the location of the calling wireless communications device 2.

In one embodiment, when a location determination is initiated, the receiving sites (one or more of the monitoring stations 10 and/or the base stations 12) mark the arrival time of the signal, the electronic serial number/mobile identification number or similar identifier of the calling wireless communications device 2, the channel on which the call is received, and/or the received sector. Although this information may be useful, it is not required according to the geolocation process of the present invention. Other information that can be recorded, but that is not necessarily required, includes the DCC (digital color code) or other parameters that identify the base station 12 that is being accessed, and the signal strength. In yet another embodiment, angle of arrival information may be determined to aid in the position determination as discussed further below.

The location determining process is based on signal information collected at one or more of the monitoring stations 10 or base stations 12. The algorithm of the present invention for geolocating the wireless communications device 2 can be executed at any of the receiving monitoring stations 10 or base stations 12, at a central processing site on a general purpose computer within the cellular telephone system, or on a dedicated E911 computer specifically designated to determine the location of the calling wireless communications device 2. The communications link for carrying the time of arrival information and the identification information described above from the receiving monitoring stations 10 and the receiving base stations 12 to the algorithm execution site may include a dial-up call (either land-line or cellular), a wireless link, a dedicated circuit or the existing communications link between each base station 12 and the mobile telephone switching office (MTSO), where the land line system interfaces to the cellular system. Typically, the site where the position determination is made is linked to the MTSO and from there to the landline telephone system so that the geolocation information can be delivered to the emergency service providers.

The present invention teaches a frequency domain approach for determining the TDOA of a signal received at two (or more) different locations, i.e., including one or more of the monitoring stations 10 and the base stations 12. At each receiving site the received signal is demodulated and decomposed into its constituent frequencies, i.e., the signal is transformed from the time domain to the frequency domain. Pragmatically, a time 'slice' of each received signal is decomposed; in one embodiment the time 'slice' is on the order of about 100 msec long. In one embodiment, the fast Fourier transform algorithm is employed to perform the time to frequency transformation. Other known transform methods that relate the dual time/frequency nature of a signal, such as the Fourier integral, the discrete Fourier transform, the Hilbert, Laplace and Hartley transforms can be used in other embodiments.

In the frequency domain, each frequency component of the time domain signal has a phase angle and magnitude, which can be represented by a two-dimensional number, e.g., the phase and magnitude values or the real and imaginary parts of a complex number. Thus the time domain signal received at two receiving sites may now be represented in the frequency domain by complex numbers having a phase angle and magnitude, for each frequency component of the received signal. As is known to those skilled in the art, these complex numbers can also be represented as the sum of a real part and an imaginary part, or can be represented with other notations depending on the selected coordinate space.

In the embodiment where the mobile signal is received at the two receiving sites and transformed, there are two frequency domain representations of the two received signals. More generally, and to increase the position determination accuracy, the received signals at N receiving sites, where N>2, are transformed to the frequency domain for subsequent processing according to the present invention.

The TDOA information is derived from the frequency domain representations by determining the phase difference for each of the like-frequency components (i.e., frequency components that appear in each of the frequency domain representations), and in one embodiment, observing the phase difference values as a function of their like-frequency component. If one were to plot these phase values as a function of the frequency, the plot is a straight line with a slope that is directly proportional to the time difference of arrival. The "y" intercept of the line is the observed frequency difference between the two signals.

In other embodiments described below, it is not necessary to construct the referred-to plot, as the TDOA is derived from mathematical manipulation of the phase values of the like-frequency domain components. For example, the Hermitian product or derivative approach, as described below, can be used. The latter technique produces the TDOA directly through a wholly mathematical process and thus does not require graphing the pairwise phase difference values as a function of frequency In practice, additive noise causes the phase values to be scattered about the ideal line and thus a regression analysis can be employed to determine the best fit line. The regression analysis can be employed in the wholly mathematical approaches to finding the TDOA as described herein.

The frequency error as represented by the y-axis intercept has several possible causes, including frequency inaccuracy in base station and monitoring station receivers at 12 and 10, in the wireless communications device 2, and Doppler frequency shifts due to the motion of the wireless communications device 2. If a particular wireless communications device 2 has a significantly resolvable frequency error, then the error can be used as an "RF signature" to separate the various signals received at a receiving site to further identify the signal from the wireless communications device of interest, i.e., the signal from the wireless communications device 2 for which the location is to be determined. The frequency offset can also be used to "tune" the system, adjusting components of the system until the frequency offset is reduced.

According to the Hermitian product (also known as the inner product) methodology, the time domain signal received at each of the N receiving sites is first transformed to the frequency domain, forming N vectors, one vector (or array) for each site. The elements of each vector comprise m complex valued phasors representing the magnitude and the phase for each frequency component in the transformed signal. The N vectors are then considered on a pairwise basis by forming the Hermitian or inner product for each frequency component present in the two pairwise vectors, i.e., the Hermitian product is formed for like-frequency components in each of the pairwise vectors. As is known the Hermitian product is the product of the magnitudes and the difference of the phase angles of the frequency components. The result of this operation is a vector having complex elements that include the phase difference for the like-frequency components present in the two vectors. Since the N vectors (for the N receiving sites) are considered in pairs, there are $N(N-1)/2$ pairwise combinations and thus. $N(N-1)/2$ resulting vectors.

When the complex vector elements are represented as the sum of a real and an imaginary part, in lieu of representation as complex phasors, the inner product can be determined for the same frequency components as the product of the complex value of one vector element times the complex conjugate of the like-frequency element from a second vector.

Since the result of the inner product computation produces phase difference values for each frequency component present in the pairwise receiving site vectors, it is possible to determine a function that describes the relationship between the like-frequency values and their associated phase difference values. Taking the derivative of this function yields the slope of the phase difference versus frequency line and thus the TDOA. Ideally, the function is a constant valued function of frequency that may be smoothed by filtering or regression analysis.

This function derivative approach offers the advantage of avoiding the discontinuities that accompany the phase unwrapping process that must be undertaken when determining the phase difference as a function of frequency. The phase unwrapping process is described in detail below. This approach also avoids the requirement to construct a plot or determine a linear equation directly from the phase difference values, from which the slope can in turn be determined.

Advantages of the frequency domain approach according to the present invention as compared with the prior art approach include: 1) finding the TDOA directly, thus avoiding the prior art computation of the time-domain cross-correlation function and the subsequent peak search to find the time offset and 2) allowing direct frequency domain filtering to optimize the TDOA by using (or heavily weighting) the phase values of only those frequency components that have a useful signal-to-noise ratio (or satisfy another signal quality metric). That is, these components can be used to weight or shape a filter transfer function such that the phase values of frequency components falling below a useful quality level are effectively disregarded. Also, the present invention allows use of the efficient fast Fourier transform and in one embodiment avoids the phase unwrapping problem associated with finding phase shifts by using a derivative of the frequency/phase function.

According to the teachings of the present invention, in one embodiment, to determine the TDOA of a signal at two or more receiving sites each receiving site (either a base station or a monitoring station 10) time stamps (also referred to as a time hack or a time marker) the receipt of the same known signal time slice. The magnitude and phase of the frequency spectrum components of the signal time slice are determined by a transformation to the frequency domain (note that only the phase is required for further processing). The phase value for each frequency component is sent to a central site or another receiving site to determine the TDOA.

This aspect of the present invention is a substantial improvement over the prior art process, wherein an entire raw time domain signal interval or digital samples thereof must be transmitted from each receiving site to the central processing site to perform the aforementioned time domain cross-correlation. Since this can represent a considerable quantity of data, a wide bandwidth (i.e., high speed) transmission medium may be required to ensure that the data is quickly transmitted to the central processing site so that the TDOA value, and thus the geolocation, can be calculated with minimal delay. In contrast, according to the methodology of the present invention, the amount of data that must be sent from each receiving site to a TDOA processing site is reduced as only the frequency spectrum information (more specifically the phase information for each spectral component) is required. Thus substantially less data must be transmitted than that required by the prior art time-domain TDOA approach. As a result, the present invention may not require a wide bandwidth channel from each receiving site to the TDOA processing site for the data to be transferred quickly and the TDOA determined.

Alternatively, in another embodiment of the present invention, the raw time domain signal and the time marker can be transmitted to the TDOA processing site, although this technique may not yield a TDOA determination in the shortest time.

There are several available choices for the time slice signal from which the TDOA is calculated. As is known, in the conventional cellular system each monitoring station 10 is configured to monitor the control channels usable by a wireless communications device 2 within the coverage area of the monitoring region 11. In a cellular system, time utilization of reverse control channels (i.e., control communications from the wireless communications device 2 to the cellular base station 12) is statistically low. Therefore a monitoring station 10 (at a higher elevation than nearby cell sites 12) may provide a coverage area extending over multiple reusers of the same control channel as utilized within multiple cells 14, with a low probability of interference from signal "collisions." Thus the control channel signals received at one or more monitoring stations 10 can be advantageously used in the position determination process by determining the TDOA of a signal received at a monitoring station 10 with respect to the same control channel signal received at another monitoring station 10 or at a cellular base station 12. Because the cellular telephone system in the United States is structured so that each area is served by two cellular service providers and possibly several PCS providers, a monitoring site 10 may be designed to monitor channels including those of more than one provider, with potential sharing of signal monitoring resources and thus geolocation determining functions by more than one carrier.

In systems constructed according to certain protocols, such as AMPS (Advanced Mobile Phone Service), EAMPS (Extended Advanced Mobile Phone Service) and systems employing a time division multiplex access (TDMA) protocol, precise time of arrival information at a receiving site can be derived from a priori knowledge of certain segments of the transmitted message from the wireless communications device 2. For instance, in EAMPS a 'dotting sequence' followed by a Barker code always precedes a reverse control channel message. This sequence alerts the receiving sites that a message is arriving, and each word in the sequence is repeated five times. Each receiving site can calculate the time of arrival of a specific reference point within this sequence, from which the time difference of arrival between two or more receiving sites can be determined as described herein.

In one embodiment of the present invention, emergency service providers can use a wireless communications device with a known location to test the geolocation system, determine the accuracy of the calculated location and calibrate system components. For example, the operational parameters of receiver components at the receiving sites can drift out of calibration. These components can introduce an offset in phase delay in the received signal and thus introduce errors in the position determination. Periodic testing of the system can detect these errors, in response to which the receiver components can be calibrated. Also, the receiving elements can include a self-calibration process to ensure accurate position determination.

The mathematical basis for the frequency domain TDOA technique of the present invention is set forth below. Let $f_1(t)$ and $f_2(t)$ be the received signals at two spaced-apart receiving stations 1 and 2, such as a monitoring site 10 and/or a cell site 12, and let f(t) be the transmitted signal. Then, neglecting multipath, dispersion and other propagation effects in the interest of clarity, $$f_1(t) = \alpha f(t-t_1)$$

$$f_2(t) = \beta f(t-t_2)$$

where $\alpha$ and $\beta$ are real valued amplitude scaling factors, and $t_1$ and $t_2$ represent the time required for the signal to propagate from the wireless communications device to each of the receiving sites 1 and 2.

The operative Fourier transform pairs are then:

$$f(t) \Rightarrow F(\omega)$$

$$f_1(t) \Rightarrow F_1(\omega)$$

$$f_2(t) \Rightarrow F_2(\omega)$$

By performing the Fourier transforms of $f_1(t)$, $f_2(t)$, and f(t), and applying the Fourier shifting theorem:

$$F_1(\omega) = \alpha \exp(-i\, t_1 \omega) F(\omega)$$

$$F_2(\omega) = \beta \exp(-i\, t_2 \omega) F(\omega).$$

Next find the Hermitian or inner product of $F_1(\omega)$ and $F_2(\omega)$.

$$F_2^*(\omega) F_1(\omega) = \alpha\beta \exp(i(t_2-t_1)\omega)) |F(\omega)|^2 \quad (1)$$

Where * indicates the complex conjugate. The result is a complex valued function whose argument includes the time difference. Define a phase function that is a function of frequency, $$\Phi(\omega) = \arg(F_2^*(\omega) F_1(\omega))$$

Thus $\Phi(\omega)$ expresses the phase difference between $F_1(\omega)$ and $F_2(\omega)$ for like frequency values.

Thus $$\Phi(\omega) = (t_2-t_1)\omega$$

The time offset or the TDOA is given by the concise formula $$d\Phi(\omega)/d\omega = (t_2-t_1) = \Delta t.$$

This equation depicts the ideal result, for perfect signals without noise or other corruptions, such that $\Phi(\omega)$ is a linear function whose slope is the TDOA and the y-axis intercept is zero.

Note that according to this mathematical process for finding the TDOA, it is not necessary to actually plot the phase difference values as a function of frequency to find the line slope, which equals the TDOA. Instead, the TDOA is found mathematically from the two functions $F_2(\omega)$ and $F_1(\omega)$, which are the frequency domain representations of the received signals, with each signal component in $F_2(\omega)$ and $F_1(\omega)$ having a magnitude and a phase value. The process described above can be easily extended to three receiving sites, and thus three TDOA ($\Delta t$) values are calculated. For N sites, $N(N-1)/2$ values are calculated.

Since practical implementations of the teachings of the present invention will contain noise effects, a methodology to remove or minimize these effects must be employed. According to two embodiments of the present invention the following two methods can be employed to find the TDOA, given the phase difference function $\Phi(\omega)$.

According to the first embodiment, a statistical process is used to find the slope estimate. In one embodiment a simple linear regression suffices, but a frequency-weighted linear regression can also be employed. Both linear regression formulae are set forth below.

However, both methods also require, to avoid discontinuities in the phase function, that the phase in the $\Phi(\omega)$ function be unwrapped before the TDOA value can be found. Since the argument function has a period $2\pi$, and likely the time offset spans more than $2\pi$ radians, multiples of $2\pi$ must be added to the phase function to make the phase function continuous. Various phase unwrapping techniques are known to those skilled in the art.

Once the phase function (i.e., $\Phi(\omega)$ above) has been successfully unwrapped, the slope can be found and the $\Delta t$ value calculated. Typically, the $\Delta t$ value calculated above does not present a constant valued function of frequency due to noise and other influences, such as multipath effects, fading etc. Thus a linear regression or weighted linear regression can be used to find the best fit line to the $\Phi(\omega)$ values as a function of frequency.

The practical computations set forth herein use a discrete version of the aforementioned functions. Using $\Phi_k$ and $\omega_k$ to be R length vectors (k=1 to k=R) containing samples of the $\Phi(\omega)$ function (where the samples are the $\Delta t$ values designated by $\Phi_k$) and the corresponding frequencies are represented by $\omega_k$, the least squares linear regression for finding the slope (that is, the TDOA estimate or average $\Delta t$) is:

$$\overline{\Delta t} = \frac{R\sum_{k=1}^{R}\Phi_k\omega_k - \sum_{k=1}^{R}\Phi_k\sum_{k=1}^{R}\omega_k}{R\sum_{k=1}^{R}\omega_k^2 - \left(\sum_{k=1}^{R}\omega_k\right)^2}$$

In another embodiment where a frequency domain weighted least squares technique is employed, the TDOA estimate or average $\Delta t$ is found from:

$$\overline{\Delta t} = \frac{\sum_{k=1}^{R}W_k\sum_{k=1}^{R}W_k\Phi_k\omega_k - \sum_{k=1}^{R}W_k\Phi_k\sum_{k=1}^{R}W_k\omega_k}{\sum_{k=1}^{R}W_k\sum_{k=1}^{R}W_k\omega_k^2 - \left(\sum_{k=1}^{R}W_k\omega_k\right)^2}$$

$W_k$ is a frequency domain weighting function. The values for $W_k$ can be determined according to the importance of the corresponding frequency component. Thus they can be determined based simply on signal amplitude, power, inverse variance, etc. In the simple case of conventional averaging, $W_k=1/R$. In this embodiment it is not necessary to normalize the weighting function, i.e., sum to one.

Another technique to determine the TDOA avoids the phase unwrapping process and reduces the order of the curve fit from first degree to zero degrees. According to this process the argument function is differentiated, then simple weighted averaging is used to find the TDOA estimate. First the argument function is separated into its real and imaginary components, namely $I(\omega)$ and $Q(\omega)$. Then the derivative process is performed on the two real valued functions. Let $$I(\omega)=Re(F_2{}^*(\omega)F_1(\omega))$$

and $$Q(\omega)=Im(F_2{}^*(\omega)F_1(\omega)).$$

Thus, $$\begin{aligned}d/(\arg(F_2*(\omega)F_1(\omega))/d\omega &= d(\tan^{-1}Q(\omega)/I(\omega))/d\omega \quad (3)\\ &= [I(\omega)(dQ(\omega)/d\omega)] - \\ &\quad [Q(\omega)(dI(\omega)/d\omega)]/(I^2(\omega)+ \\ &\quad Q^2(\omega))\\ &= \Delta t(\omega)\end{aligned}$$

As discussed in conjunction with the previous methodologies, although the result of equation (3) is ideally a constant valued function of frequency corresponding to the TDOA, in practice the signals contain noise and thus an averaging and/or smoothing process is employed to improve the quality of the TDOA estimate. This averaging process can be performed as a linear or weighted regression analysis as described above or as a weighted average, where the "out of band" signals are weighted lightly or removed from consideration (including any signals where a signal quality metric indicates that the signal value should no be considered).

Let $$\Psi(\omega)=[I(\omega)(dQ(\omega)/d\omega)]-[Q(\omega)(dI(\omega)/d\omega)]/(I^2(\omega)+Q^2(\omega))$$

Now let $\Psi_k$ be a vector of M samples from $\Psi(\omega)$. Then the estimate for $\Delta t$ is $\Delta t=\Sigma$ for k=1 to k=M: $\Psi_k W_k$ where the weighting function $W_k$ is normalized so that $$\sum_{k=1}^{M}W_k = 1$$

Again, $W_k$ is a frequency domain weighting function. The values for $W_k$ can be determined according to the importance of the corresponding frequency component. Thus they can be determined based simply on signal amplitude, power, inverse variance, etc. In the simple case of conventional averaging, $W_k=1/M$.

When the received time-based signals are transformed to the frequency domain to perform the TDOA calculations as described above, certain frequency components having a low signal to noise ratio can be removed to improve the location precision and avoid the computing time required to process these signal components. One technique for removing these components uses the weighed averaging technique described above. In another embodiment, these components can be removed by frequency domain filtering. Since according to the teachings of the present invention the TDOA calculation is performed in the frequency domain, a simple frequency domain window (i.e., filter) may be applied to remove frequency components or assign lower "weights" to these less important components. For example, if signal-to-noise ratio information (or any other signal quality metric, such as bit error rate or signal power) is available, a filter can be constructed to reduce the weighting of or remove the components falling below a useful value of the signal quality metric. In this way the influence of the noise or other signal degradation is minimized. The filter function can also be adaptive according to changes in the signal and noise characteristics.

In yet another embodiment, the power spectrum is determined for a plurality of sample signals in the frequency domain. The power spectra can be added and the sum divided by the expected noise power. The resulting value serves as a mask for filtering out the frequency components and thus reduces the computational time of the geolocation algorithm.

In another embodiment, a statistically-based mask can be determined by calculating the variance of the energy or entropy in each frequency component. This variance value can serve as filter mask, removing those components that fall outside the calculated variance. In yet another embodiment a matched filter can be employed as the filter function.

The preferred filter is a real valued frequency domain window filter, i. e., a filter with a transfer function $W(\omega)$, for removing the components falling below the useful signal quality metric value. The real valued characteristic is preferred so as not to add a phase angle value to the Hermeitian product and thus distort the TDOA value. Several different filter transfer functions are available to perform this function. The simplest such function is a conventional pass band filter where the frequency components above and below the pass band (where the pass band is defined based on a signal quality metric of the components of interest) are filtered out or attenuated. More complex filters (such as matched filters) can assign a weight to each signal component, where the weight is representative of the signal quality metric as described above. Finite Impulse Response (FIR) filters are suitable for this application. Higher quality signals are weighted with higher value weights to reduce the effects of noise on the TDOA determination. It is recognized that the filtering process is not necessarily a required step according to the present invention, but it can improve the location accuracy under certain conditions.

The filter transfer function is represented by $W(\omega)$ and thus equation (1) above becomes, $$F_2^*(\omega)F_1(\omega)W(\omega)=\alpha\beta\exp(i(t_2-t_1)\omega)|F(\omega)|^2 W(\omega).$$

Preferably the filter is real valued, that is, the filter transfer function has no phase angle term. The magnitude of the filter transfer function can include the weighting values discussed above and thus the weights are a function of frequency.

In the idealized case, the y-intercept for the argument plot is zero, as the ideal case assumes no frequency offset at the two or more receiving stations. In any case, if there is a frequency offset, caused by either motion of the wireless communications device (i.e., Doppler shifting) or mismatched receiving components at the two receiving sites, the line slope remains unchanged, but the y-intercept changes in accordance with the frequency offset, that is, the line is merely shifted on the x-y coordinate plane with no change in slope. Thus the techniques of the present invention can be employed notwithstanding a non-zero frequency offset (y intercept). The offset may be used to retune the receiving components at the receiving sites, as part of a feedback loop until the offset is minimized or eliminated.

According to the prior art cross-correlation technique, this frequency shift changes the location of the cross correlation function peak, and since the frequency offset is unknown, the peak location can be accurately determined only be assuming a frequency offset, calculating the cross correlation function and finding the peak, then assuming a different frequency offset and repeating the process. The highest peak from among the multiple iterations through the process represents the time offset of the two received signals. This is clearly a laborious process and is avoided according to the teachings of the present invention.

Once the TDOA value has been determined according to one of the techniques set forth above, it is possible to determine the location of the wireless communications device 2. Since the equations that relate the TDOA and the wireless communications device location are not readily invertible, an iterative scheme is used to find the location of the wireless communications device given the TDOAs and the locations of the receiving sites, that is, either the monitoring sites 10 or cell sites 12.

One prior art scheme uses a grid approach to subdivide the region encompassing the location of the wireless communications device 2 into a set of smaller grid regions. A search is conducted over the grid regions by calculating the error between the actual TDOA value as calculated above, and the TDOA value resulting from placing a test wireless communications device in each of the grid regions. The process steps though each of the grid subdivisions, and after all grid regions have been checked, the "best" region is determined. That region is further subdivided and a subsequent iterative search is performed for each of the subdivided regions. Again, after all regions are checked, the "best" region is found. The process continues until a region of sufficiently small size (i.e., as determined by the desired accuracy of the final position determination) is found. This region represents the position of the wireless communications device.

This known prior art process uses pairs of receiving sites for each grid search. That is, a pair of receiving sites is selected and the grid process executed as above until the best location with the desired accuracy is determined. Then another pair is selected and the grid process executed again. After all the pair TDOA values have been used to find a mobile location, all locations are averaged to find the final mobile location.

A method according to the present invention uses "differential correction," which is essentially a predictor-corrector method, to find the wireless communications device location. In this method the errors in the DDOA (distance difference of arrival, which is the difference between the distance from each receiving site to the wireless communications device 2, or the product of the TDOA and the speed of light) are linked to the errors in the wireless communications device's location via a differential equation. Solving the differential equation provides a correction for the location of the wireless communications device 2. The correction process is iterated until the location error is less than a predetermined minimum value. Advantageously, this method does not use individual pairwise location determinations as taught by the prior art, but instead uses all the TDOA values (i.e., from all of the receiving site pairs) to create a mathematical system that can be over determined if a sufficient number of sites receive the mobile signal. In any case, a more accurate and faster result is obtained.

The method of differential correction involves the following steps.

(a) Pick a "seed" or initial location for the wireless communications device. In one embodiment this is the geographic center of the receiving sites for which a TDOA value has been calculated.

(b) Calculate a distance difference of arrival (DDOA) using the receiving site locations and the seed location.

(c) For each pair of receiving sites, calculate the pairwise DDOA error, that is, the measured DDOA less the predicted DDOA, where the measured value is the TDOA calculated above multiplied by the speed of light and the predicted value was determined in step (b) above.

(d) Using the DDOA error value and the TDOA equation, solve for the error in the wireless communications device's location. In one embodiment, this step is performed by placing the data in a matrix and finding the least squares solution to an over determined system.

(e) Update the mobile's location by adding the error found in the step (d) to the seed location above or the previously calculated location.

(f) If the magnitude of the correction added to the mobile's location is greater than a predetermined threshold, go back to step (b) and repeat the process, otherwise the location has been found with the desired degree of accuracy.

The primary advantage of the method according to the present invention is its computational efficiency. Instead of searching "all over the grid", this method quickly converges to the result. Another advantage is the adaptability of the algorithm to a variable number of receiving sites. Finally, since no grid is used, there is no concern or restriction associated with the geometry of the sites and the shape and size of the search space in the grid.

Since N receiving sites yield $N(N-1)/2$ site pairings, the process continues by enumerating these sites beginning with 1 and continuing to $N(N-1)/2$. Some possible pairing counts are shown below:

| Number of Sites | Number of Pairings |
| --- | --- |
| 2 | 1 |
| 3 | 3 |
| 4 | 6 |
| 5 | 10 |
| 6 | 15 |

The operative TDOA equation for a pair of receiving sites (designated 1 and 2) is:

$$\Delta_{12} = \text{sqrt}[(X_1-x)^2+(Y_1-y)^2] - \text{sqrt}[(X_2-x)^2+(Y_2-y)^2] \quad (4)$$

Where the variables are defined below.

$\Delta_{12}$ is the distance difference of arrival, DDOA, between receiving sites 1 and 2. This value is equal to the TDOA between the two receiving sites multiplied by the speed of light.

$X_1$ and $Y_1$ are the coordinates of receiving site 1, $X_2$ and $Y_2$ are the coordinates of site receiving 2, x and y are the coordinates of the wireless communications device.

These values represent the seed location during the first interation through the process and the corrected wireless communications device location for subsequent iterations.

For other receiver site pairings, the subscripts can be changed to the appropriate numbers identifying the receiving sites. Thus the number of $\Delta_{xy}$ values according to equation (4) equals the number of receiver site pairings.

To determine the difference between the predicted location and the actual location based on the TDOA values, it is helpful to determine the differential form of the TDOA equation (4), which is found by implicit differentiation with respect to $\Delta_{12}$, with the variables x and y treated as functions of $\Delta_{12}$. The result is:

$$-\Delta_{12} = (\chi_1/\xi_1 - \chi_2/\xi_2)dx + ((\gamma_1/\xi_1 - \gamma_2/\xi_2)dy \quad (5)$$

where the following substitutions are made:

$\chi_1 = X_1 - x$ $\chi_2 = X_2 - x$ $\gamma_1 = Y_1 - y$ $\gamma_2 = Y_2 - y$ $\chi_1 = \text{sqrt}(\chi_1^2 + \gamma_1^2)$ $\chi_2 = \text{sqrt}(\chi_2^2 + \gamma_2^2)$ Equation (5) is a linear equation (with respect to the differentials) and therefore amenable to matrix solution methods to solve for dx and dy using the TDOA for receiving stations 1 and 2, that is $-\Delta_{12}$ is the product of the speed of light and the TDOA value. The only unknowns on the right side of (5) are dx and dy. Thus new x and y coordinates representing the location of the wireless communications device are determined by adding the previous x and y values to the calculated dx and dy values respectively. The new x and y coordinate locations are then plugged back into equation (4) above to recalculate the DDOA value based on the new location and determine new dx and dy values. The process continues until the error between the previous and the current DDOA (i.e., dx and dy) is less than a convergence threshold.

Following is a detailed example of the differential correction process of the present invention. The differential correction process begins, as described above, by determining a seed location for the wireless communications device. In one embodiment the following formulae can be used to determine the starting values (i.e., the x and y coordinates) for the wireless communications device's position (x,y) at the geographic center of the N receiver sites, each located at $(X_i, Y_i)$ $$x = \frac{1}{N}\sum_{i=1}^{N} X_i$$

$$y = \frac{1}{N}\sum_{i=1}^{N} Y_i$$

According to this equation all receiving sites are considered in determining the seed location, although this is not necessarily required. In other embodiments according to the teachings of the present invention, other techniques can be used to determine an initial seed location for the wireless communications device, including, advantageously a location that allows the iterative algorithm to quickly converge to a location with an acceptable error margin.

Given the N receiving sites and the corresponding $N(N-1)/2$ TDOA values determined as described above, the following matrix is found for the data according to equation (4) and its differential form of equation (5). For this example N=4, but the process is easily adaptable to other values of N. For N=4 there are six TDOA values.

$$\begin{bmatrix} -d\Delta_{12} \\ -d\Delta_{13} \\ -d\Delta_{14} \\ -d\Delta_{23} \\ -d\Delta_{24} \\ -d\Delta_{34} \end{bmatrix} = \begin{bmatrix} (\chi_1/\xi_1 - \chi_2/\xi_2) & (\gamma_1/\xi_1 - \gamma_2/\xi_2) \\ (\chi_1/\xi_1 - \chi_3/\xi_3) & (\gamma_1/\xi_1 - \gamma_3/\xi_3) \\ (\chi_1/\xi_1 - \chi_4/\xi_4) & (\gamma_1/\xi_1 - \gamma_4/\xi_4) \\ (\chi_2/\xi_2 - \chi_3/\xi_3) & (\gamma_2/\xi_2 - \gamma_3/\xi_3) \\ (\chi_2/\xi_2 - \chi_4/\xi_4) & (\gamma_2/\xi_2 - \gamma_4/\xi_4) \\ (\chi_3/\xi_3 - \chi_4/\xi_4) & (\gamma_3/\xi_3 - \gamma_4/\xi_4) \end{bmatrix} \begin{bmatrix} dx \\ dy \end{bmatrix} \quad (6)$$

The delta values are the distance difference errors calculated from the measured distance value based on the TDOA between the two stations represented by the subscripts, minus the predicted value for the location. For the first iteration the predicted value is the initial seed location. For subsequent iterations the predicted value is determined as follows. Since the differential form of the equation contains a minus, we reverse the order of the terms when forming the $d\Delta$ values below, that is, the $d\Delta$ values are shown as the predicted value $(\xi_1-\xi_2)$ less the measured value $(ct'_{12})$. For N=4:

$$\Delta = \begin{bmatrix} d\Delta_{12} \\ d\Delta_{13} \\ d\Delta_{14} \\ d\Delta_{23} \\ d\Delta_{24} \\ d\Delta_{34} \end{bmatrix} = \begin{bmatrix} \xi_1 - \xi_2 - ct'_{12} \\ \xi_1 - \xi_3 - ct'_{13} \\ \xi_1 - \xi_4 - ct'_{14} \\ \xi_2 - \xi_3 - ct'_{23} \\ \xi_2 - \xi_4 - ct'_{24} \\ \xi_3 - \xi_4 - ct'_{34} \end{bmatrix}$$

where c is the speed of light and $t_{xy}'$ is the TDOA between sites x and y. The delta values form a column vector of $N(N-1)/2$ values, as shown above.

The matrix, A, as defined below, is used to determine the wireless communications device's location correction vector.

$$A = \begin{bmatrix} (\chi_1/\xi_1 - \chi_2/\xi_2) & (\gamma_1/\xi_1 - \gamma_2/\xi_2) \\ (\chi_1/\xi_1 - \chi_3/\xi_3) & (\gamma_1/\xi_1 - \gamma_3/\xi_3) \\ (\chi_1/\xi_1 - \chi_4/\xi_4) & (\gamma_1/\xi_1 - \gamma_4/\xi_4) \\ (\chi_2/\xi_2 - \chi_3/\xi_3) & (\gamma_2/\xi_2 - \gamma_3/\xi_3) \\ (\chi_2/\xi_2 - \chi_4/\xi_4) & (\gamma_2/\xi_2 - \gamma_4/\xi_4) \\ (\chi_3/\xi_3 - \chi_4/\xi_4) & (\gamma_3/\xi_3 - \gamma_4/\xi_4) \end{bmatrix}$$

The correction vector is found by a least squared error process, as follows:

$$\begin{bmatrix} dx \\ dy \end{bmatrix} = (A^T A)^{-1} A^T \Delta$$

Since the quantity $(A_T A)^{-1}$ is a 2×2 array, the inversion is quite simple to perform.

Thus the following formula is used to determine an updated position (x', y') of the wireless communications device, based on the previous position (x,y).

$$\begin{bmatrix} x' \\ y' \end{bmatrix} = \begin{bmatrix} x \\ y \end{bmatrix} + \begin{bmatrix} dx \\ dy \end{bmatrix} \quad (7)$$

The primed values represent the updated location, from which a new predicted value of DDOA is determined for insertion into equation (6) above, and the calculation of a new $d\Delta$ for another iteration through the process. In another embodiment, the number of iterations through the location determining algorithm as described above can be limited to a predetermined number to avoid a situation where the process does not converge within a given time interval.

The above process assumes a flat earth. It is known to one skilled in the art that extension to a curved earth or an irregular terrain is possible according to known techniques. For example, equation (4) is modified to account for the spherical earth as follows.

$$\Delta_{12} = \text{sqrt}[(X_1-x)^2+(Y_1-y)^2+(Z_1-z)^2] - \text{sqrt}[(X_2-x)^2+(Y_2-y)^2+(Z_2-z)^2]$$

where the Z axis variable has now been included.

In this embodiment the differential correction formula (5) becomes $$-\Delta_{12} = (\chi_1/\xi_1 - \chi_2/\xi_2)dx + (\gamma_1/\xi_1 - \gamma_2/\xi_2)dy + (\zeta_1/\xi_1 - \zeta_2/\xi_2)dz$$

where the following substitutions are made $\chi_1 = X_1 - x$ $\chi_2 = X_2 - x$ $\gamma_1 = Y_1 - y$ $\gamma_2 = Y_2 - y$ $\zeta_1 = Z_1 - z$ $\zeta_2 = Z_2 - z$ $\xi_1 = \text{sqrt}(\chi_1^2 + \gamma_1^2 + \zeta_1^2)$ $\xi_2 = \text{sqrt}(\chi_2^2 + \gamma_2^2 + \zeta_2^2)$ The matrix for solving this three-dimensional problem contains three columns, however the solution methodology is the same as set forth above with respect to the two dimensional problem.

It is known that in the process of determining the location of the wireless communications device through the above technique wherein the error is minimized during each iteration, it is possible that a local minima may be identified as the location of the wireless communications device, instead of a global minima representing the location with respect to the entire search space. To avoid the conclusion that a local minima is the global minima, in another embodiment, several seed locations can be identified and the above algorithm executed for each such seed location. Since it is highly improbable for the local minima for each seed location to coincide, if the executions converge to the same location, then it is likely that the result represents the actual location (i.e., the global minima) of the wireless communications device, rather than a local minima.

Various methods are known for determining the angle of arrival (AOA) information from the signal received at one or more of the receiving sites. In one embodiment the angle of arrival information can be advantageously combined with the TDOA values to determine the location of the wireless communications device. For example, the AOA can be used as a test to ensure that the location calculated above is a global minima and not a local minima. Further, if TDOA information is not available from a sufficient number of sources to determine the location, due to noise, for example, the AOA information can be advantageously combined with the available TDOA information and the location may be therefore determinable from the combination of the TDOA and AOA information. The AOA information may also be useful in determining a "seed" location and as a result the location algorithm may converge more quickly to the location value.

Figure 3:
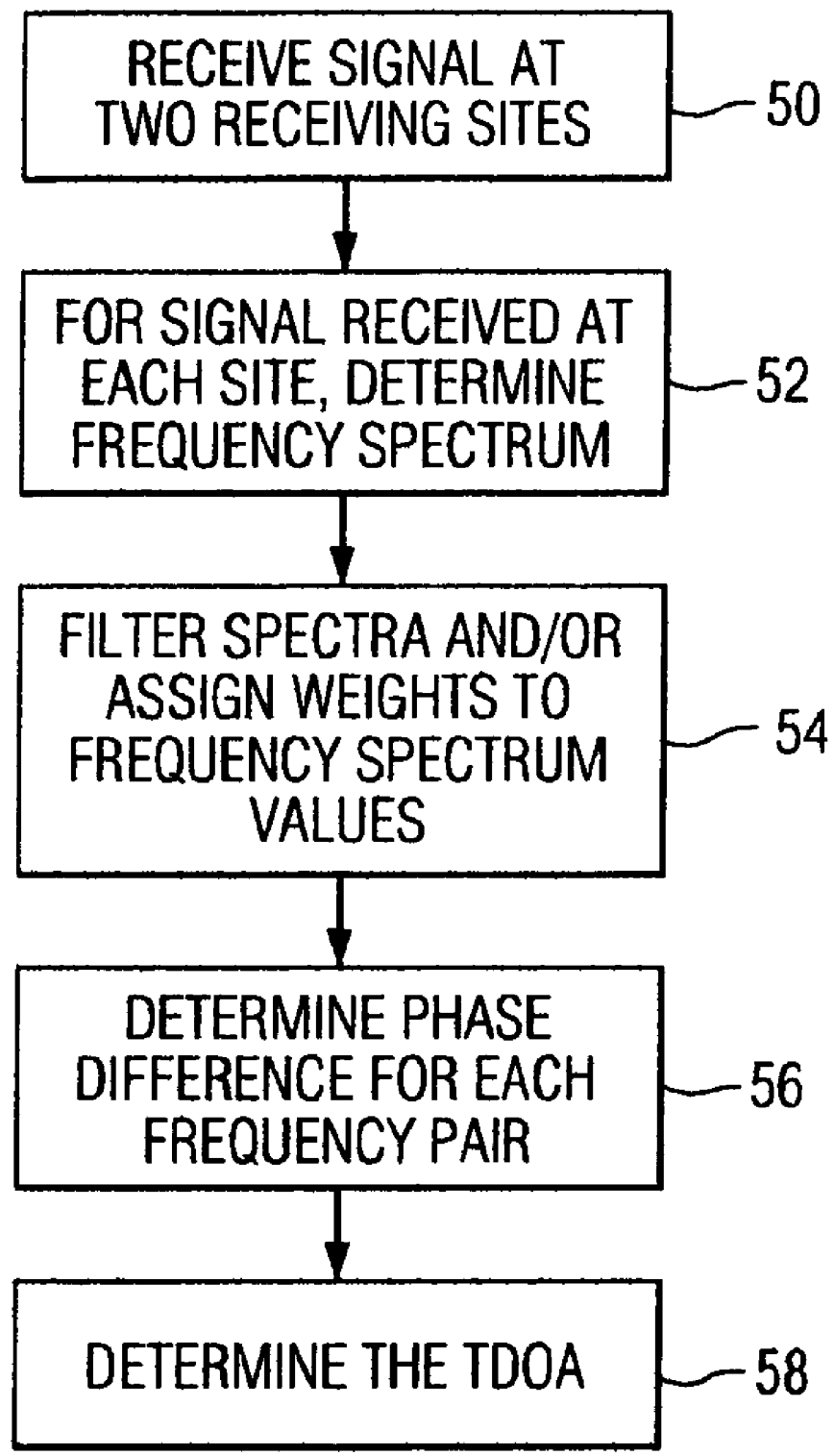
FIGS. 3 and 4 are flowcharts illustrating the geolocation processes according to the present invention.
Figure 4:
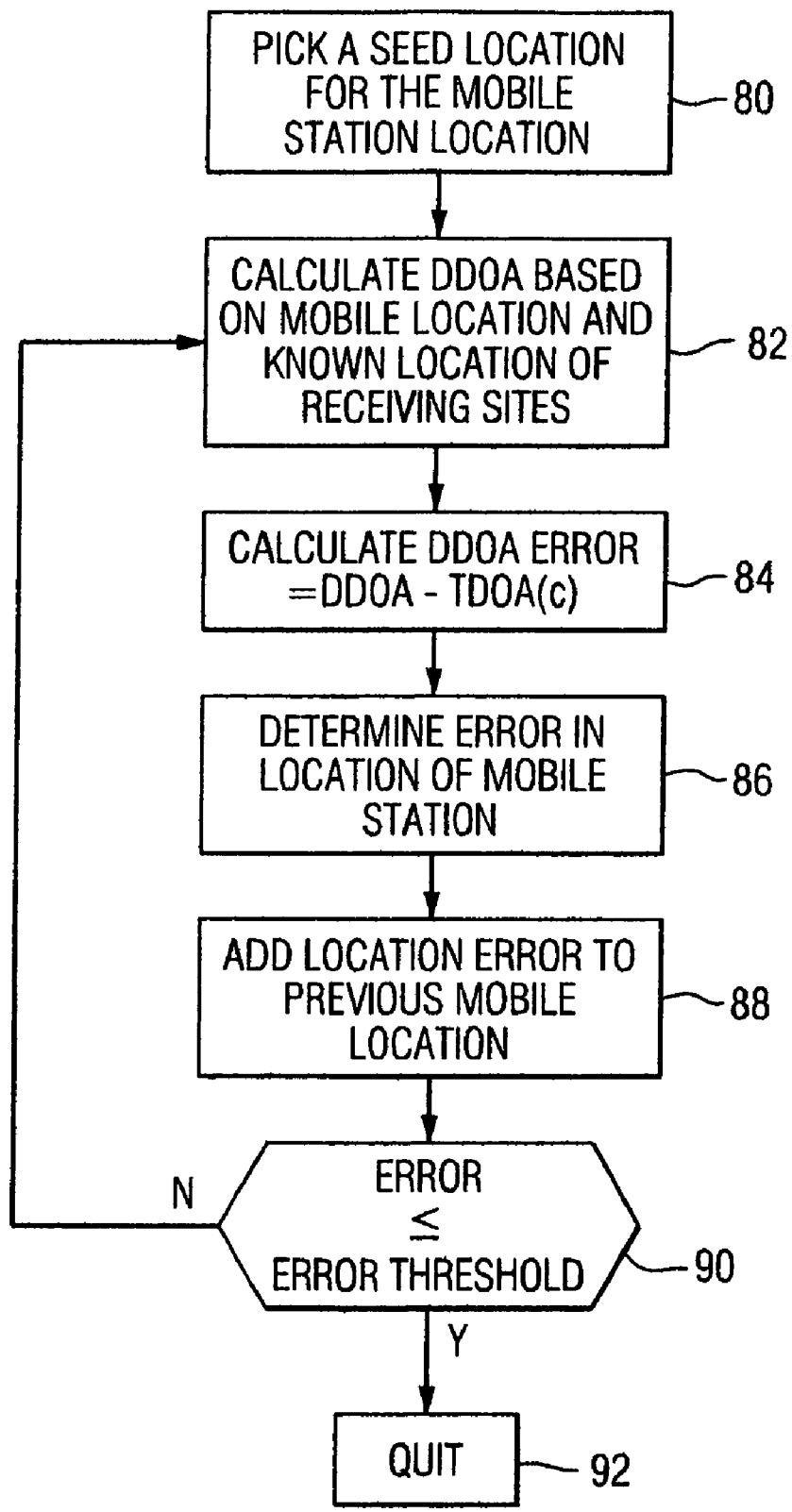

FIG. 3 illustrates a flow chart for determining the TDOA value as above, and FIG. 4 illustrates a flow chart for determining the wireless communications device location also as described above.

FIG. 3 begins at a step 50 where a signal transmitted by a wireless communications device 2, for example an emergency 911 signal, is received at two spaced apart receiving stations, such as a monitoring station 10 and a cellular base station 12, or at two cellular base stations 12. At a step 52, the frequency spectrum for a time slice of the signal received at each receiving site is determined by one of the known time/frequency transformation techniques. The frequency spectrum is the frequency domain representation of the signal received at each receiving site, comprising a plurality of frequency components each having a magnitude and a phase value. The transformation of the received signal to the frequency domain can be performed at each receiving site or the time slice of each received signal can be transmitted to another site, such as the site of a geolocation processor, where the transformation is performed. In a preferred embodiment only the phase and magnitude information for each frequency component in the received signal is transmitted to the site of the geolocation processor along with a "time tag" and mobile device identity information. This requires far less transmitted data than the prior art system of transmitting the received time domain signal to the geolocation processor. The magnitude values of each frequency component can be useful in determining the mathematical and the frequency domain filter weighting functions described above.

At a step 54 the frequency spectrum values are weighted and/or a filter function is imposed on them to reduce the influence of noise components and out-of-band components on the subsequent processing steps. This step is not necessarily required, but can advantageously affect the results by eliminating or attenuating the affect of noise-induce components in the received signals.

At a step 56 the phase difference, as a function of frequency, is determined for each of the common frequency components in the spectra of the signal received at two receiving sites. At a step 58 these phase values are used to determine the TDOA according to the various techniques set forth above. As indicated at step 60, the slope is the TDOA for the signal as received at the two receiving sites.

The FIG. 4 differential correction process begins at a step 80 where a seed location is determined for the wireless communications device 2. One method for determining this initial location is described above, but those skilled in the art recognize that other methods are available for determining an initial location value. The objective is to select a location that allows the differential correction algorithm to converge in the fewest number of iterations, thus providing the quickest location determination.

At a step 82, the DDOA is calculated (as set forth in equation (4) above) by determining the distance between the wireless communications device 2 and each pair of receiving sites, then taking the difference of these two distance values. The DDOA error is calculated at a step 84 (according to equation (5) above) by determining the difference between the DDOA value calculated at the step 82 and the product of the previously calculated TDOA value (see the step 58 of FIG. 4) and the speed of light, c. The result of this subtraction is the DDOA error, as determined at a step 86. At a step 88, the error value is added to the previous mobile location coordinates to recalculate the mobile location.

A decision step 90 compares the location error with an error threshold. If the error is less than (or equal to in one embodiment) the convergence threshold, the algorithm processing terminates according to a step 92. Otherwise the process returns to the step 82 to redetermine the DDOA value based on the new location coordinates.

Generally, the method processes of the present invention can be executed on a dedicated processor, at one of the receiving sites or the processing site. Alternatively, the processes can be executed on general purpose processor on a time-shared basis.

Figure 5:
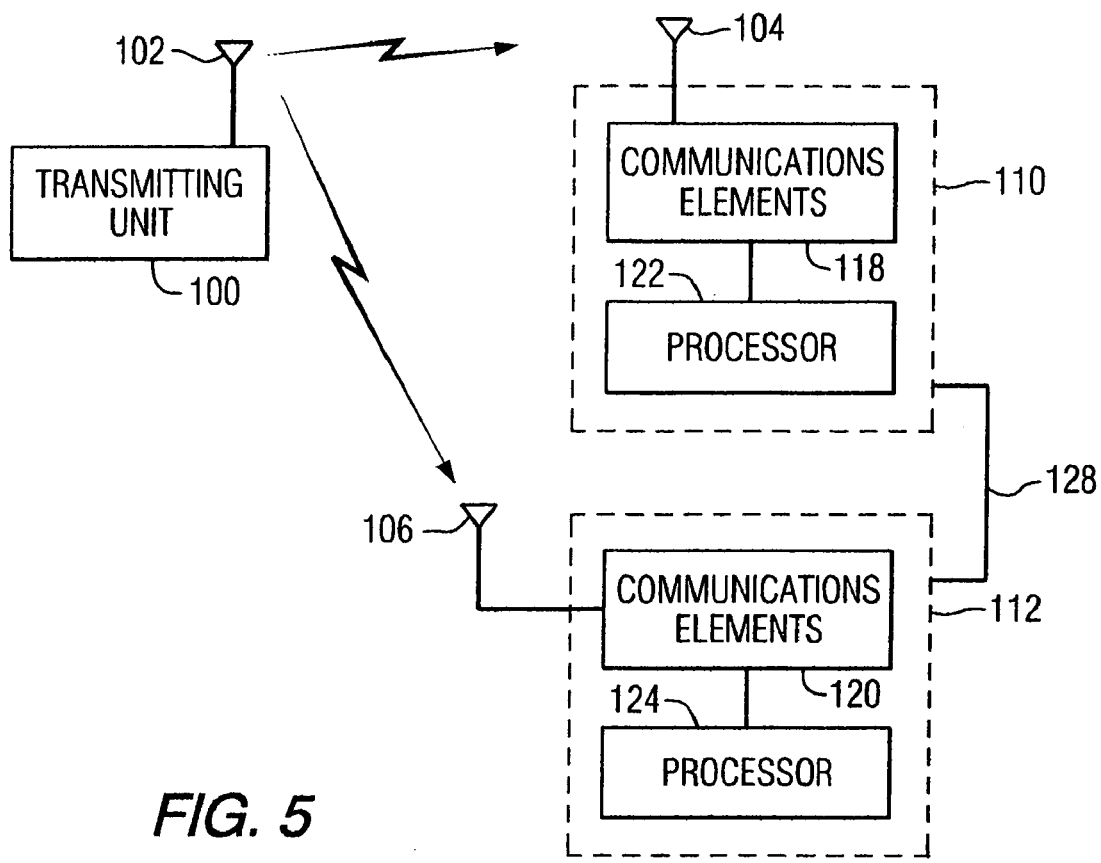
FIGS. 5 and 6 illustrate a transmitting unit and receiving sites to which the teachings of the present invention can be applied.

FIG. 5 illustrates a transmitting unit 100, comprising the communications device 2 or any of the other aforementioned transmitting devices for which the location is desired. A signal from an antenna 102 of the transmitting unit 100 is received at two antennas 104 and 106 of receiving sites 110 and 112, respectively. Each of the receiving sites 110 and 112 comprises conventional communications elements 118 and 120, respectively, for receiving, demodulating and detecting received signals. Since the receiving sites 110 and 112 typically also operate in a transmit mode, the receiving sites 110 and 112 further comprise communications elements for transmitting signals. The receiving sites 110 and 112 are representative of the base stations 12 and the monitoring stations 14, as well as the aforementioned receiving sites for receiving a signal from communications devices. Each of the receiving sites 110 and 112 further comprises a processor 122 and 124, respectively, for executing the processes according to the teachings of the present invention for determining the time difference of arrival of the signals received from the transmitting unit 100, and the location of the transmitting unit 100. The location process can be executed at either of the processors 122 or 124, in which case certain information relative to the received signal at one of the receiving sites 110 or 112 is sent to the other receiving site where the location determining process is executed on the resident processor. Thus a communication link 128 connects the receiving sites 110 and 112.

Figure 6:
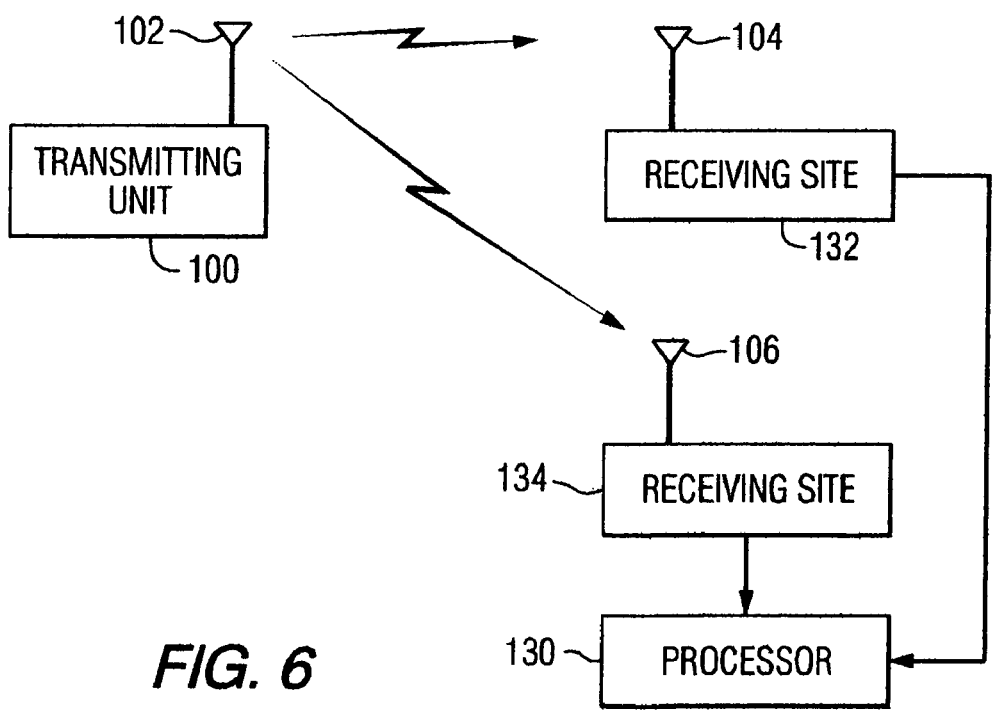

In the embodiment of FIG. 6, a processor 130, receives information relative to the signal received at receiving sites 132 and 134 for determining the location of the transmitting unit 100 in accordance with the teachings of the present invention. Each of the receiving sites 132 and 134 is linked to the processor 130 via a communications link 136.

The restrictive description and drawings of the specific examples above do not point out what an infringement of this patent would be, but are to enable one skilled in the art to make and use the invention. Various modifications can be made in the construction, material, arrangement, and operation, and still be within the scope of our invention. The limits of the invention and the bounds of the patent protection are measured by and defined in the following claims.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth herein. In addition, modifications may be made to adapt a particular situation to the teachings of the present invention without departing from its essential scope thereof. For example, the teachings of the present invention can applied to different communication schemes to find the geolocation of a wireless communications device. Therefore, it is intended that the invention not be limited to the particular embodiment disclosed as the best mode contemplated for carrying out this invention, but that the invention will include all embodiments falling within the scope of the appended claims.

What is claimed is:

1. A method for determining a time difference of arrival of a single signal transmitted from a transmitting unit and received at two or more receiving sites, the method comprising:
   (a) transforming the signal received at a first site to a frequency domain representation comprising first component signals each first component signal having a frequency and a phase angle parameter and transforming the signal received at a second site to a frequency domain representation comprising second component signals each second component signal having a frequency and a phase angle parameter;
   (b) operating in the frequency domain, determining a Hermitian product of first and second component signals having a same frequency parameter, wherein a frequency parameter of the Hermitian product comprises the same frequency parameter;
   (c) operating in the frequency domain, determining a phase angle parameter of each Hermitian product determined at the step (b);
   (d) determining a relationship between the phase angles parameter and the frequency parameter for a plurality of Hermitian products; and
   (e) determining the time difference of arrival from the relationship.

2. The method of claim 1 wherein the signal is transmitted from a transmitting unit selected from among a mobile communications device, a portable communications device, a personal communications device, a cellular communications device, a push-to-talk communications device and a trunked radio.

3. The method of claim 1 wherein the two or more receiving sites comprises N receiving sites, and wherein the time difference of arrival is determined pairwise among N receiving sites.

4. The method of claim 1 wherein the step (a) further comprises transforming each one of the two or more signals using a transformation process selected from among a Fourier transform integral, a fast Fourier transform algorithm, a discrete Fourier transform, a Hartley transform, a Hubert transform and a Laplace transform.

5. The method of claim 1 further comprising a step (f) determining a location of the transmitting unit from the time difference of arrival determined at the step (e).

6. The method of claim 1 wherein the step (d) comprises generating a phase angle versus frequency function and determining the time difference of arrival from the slope of the function.

7. The method of claim 6 wherein a y-intercept of the phase angle versus frequency function represents a frequency offset between the signal received at the two or more receiving sites.

8. The method of claim 7 wherein each receiving site comprises signal receiving apparatuses and further comprising a step (f) retuning the signal receiving apparatuses at the receiving sites to reduce the frequency offset.

9. The method of claim 1 wherein the step (d) comprises determining the relationship utilizing a regression analysis or a weighted regression analysis to determine a statistical representation of the phase angles parameter and the frequency parameter.

10. The method of claim 1 wherein the signal is transmitted from a cellular telephone and the two or more receiving sites comprise two or more cellular base stations.

11. The method of claim 1 wherein the signal is transmitted from a cellular telephone and the two or more receiving sites are selected from among two or more cellular base stations, two or more cellular monitoring stations, and a combination of cellular base stations and cellular monitoring stations.

12. The method of claim 1 wherein the signal received at the two or more receiving sites is selected from among a cell access attempt signal, a response to an incoming call, a registration signal, a control channel signal and a call requesting the dispatch of emergency or other position-relevant services.

13. The method of claim 1 wherein the step (a) further comprises determining a signal arrival time at the two or more receiving sites relative to a common time reference and determining an identification of the transmitting unit.

14. The method of claim 1 wherein the step (a) is executed at each of the two or more receiving sites and the first component signals and the second component signals are provided from the two or more receiving sites to a processing site, and wherein the steps (b)–(e) are executed at the processing site.

15. The method of claim 14 wherein the step of providing the frequency domain representation to the processing site further comprises providing the frequency domain representation to the processing site over a narrow bandwidth transmission medium.

16. The method of claim 15 further comprising determining a location at the processing site in response to the results of the step (e).

17. The method of claim 1 wherein the result of step (c) comprises a vector further comprising a plurality of elements, and wherein each element comprises a value representing a the phase angle difference for a same-frequency component.

18. The method of claim 17 wherein the number of vectors is less than or equal to the number of pairwise combinations of receiving sites.

19. The method of claim 1 further comprising sampling the signal received at each of the first and the second sites and providing sampled values to a processing site, wherein the steps (a)–(e) are executed at the processing site.

20. The method of claim 1 wherein the signal has a known format, and wherein the time difference of arrival as determined for the signal received at the two or more receiving sites is responsive to a reference point within the known format.

21. The method of claim 1 further comprising:
   (f) determining an estimated location of the transmitting unit from the time difference of arrival;

(g) determining an actual location of the transmitting unit; and (h) determining a difference between the estimated location and the actual location.

22. The method of claim 1 wherein the step (a) further comprises filtering the frequency domain representation to control the effect of certain frequency domain components on the time difference of arrival determination.

23. The method of claim 22 wherein the step of filtering further comprises determining a signal quality metric for the frequency domain components, determining a signal quality metric threshold and removing frequency components having a signal quality metric below the signal quality metric threshold.

24. The method of claim 22 wherein the step of filtering further comprises determining a signal quality metric for each frequency domain component and weighting the frequency components in accordance with the signal quality metric.

25. A method for determining a time difference of arrival of a single signal transmitted from a transmitting unit and received at two or more receiving sites, the method comprising:

(a) transforming the signal received at a first site to a first frequency domain representation comprising first component signals each first component signal having a frequency and a phase angle parameter and transforming the signal received at a second site to a frequency domain representation comprising second component signals each second component signal having a frequency and phase angle parameter;

(b) operating in the frequency domain, determining a Hermitian product of first and second component signals having a same frequency parameter, wherein a frequency parameter of the Hermitian product comprises the same frequency parameter;

(c) operating in the frequency domain, determining a phase function representing the phase angle of each Hermitian product as a function of the same frequency parameter; and (d) determining the time difference of arrival from the phase function.

26. The method of claim 25 wherein the step (d) further comprises determining a derivative of the phase function with respect to frequency and determining the time difference of arrival from the derivative.

27. The method of claim 26 wherein the step (d) further comprises determining the time difference of arrival by performing a linear regression operation on the derivative of the phase function.

28. The method of claim 27 wherein the linear regression operation further comprises a weighted linear regression operation.

29. The method of claim 25 wherein the signal is transmitted from a transmitting unit selected from among a mobile communications device, a portable communications device, a personal communications device, a cellular communications device, a push-to-talk communications device and a trunked radio.

30. The method of claim 25 wherein the two or more receiving sites comprises N receiving sites, and wherein the time difference of arrival is determined pairwise among the N receiving sites.

31. The method of claim 25 further comprising a step (e) determining a location of the transmitting unit from the time difference of arrival determined at the step (d).

32. The method of claim 25 wherein the signal is transmitted from a transmitting unit comprising a cellular telephone and the two or more receiving sites comprise two or more cellular base stations.

33. The method of claim 25 wherein the signal is transmitted from a transmitting unit comprising a cellular telephone and the two or more receiving sites are selected from among two or more cellular base stations, two or more cellular monitoring stations, and a combination of cellular base stations and cellular monitoring stations.

34. The method of claim 25 wherein the step (a) is executed at each of the two or more receiving sites and the first component signals and the second component signals are provided from the two or more receiving sites to a processing site, and wherein the steps (b)–(d) are preformed at the processing site.

35. The method of claim 25 wherein the step (a) further comprises filtering the frequency domain representation to control the effect of certain frequency domain components on the time difference of arrival determination.

36. The method of claim 35 wherein the step of filtering further comprises determining a signal quality metric for the frequency domain components and weighting the frequency components in response to the signal quality metric.

37. The method of claim 25 wherein the step (a) further comprises transforming each one of the two or more signals to the frequency domain representation using a process selected from among, a Fourier transform integral, a fast Fourier transform algorithm, a discrete Fourier transform, a Hartley transform, a Hilbert transform and a Laplace transform.

38. An apparatus for determining a location of a transmitting unit transmitting a signal received at two or more receiving sites, the apparatus comprising:

an antenna at each of the two or more receiving sites responsive to the signal;

a processor responsive to the antenna for transforming the signal received at a first site to a frequency domain representation comprising first component signals each first component signal having a frequency and a phase angle parameter and transforming the signal received at the second site to a frequency domain representation comprising second component signals each second component signal having a frequency and a phase angle parameter;

the processor for determining a phase angle parameter of a Hermitian product of first and second component signals having a same frequency parameter, wherein a frequency parameter of the Hermitian product comprises the same frequency parameter;

the processor for determining a relationship between the phase angle parameter and the frequency parameter for a plurality of Hermitian products;

the processor for determining the time difference of arrival of the signal as received at the first site and the signal as received at the second site; and the processor for determining the location of the transmitting unit in response to the time difference of arrival.

39. A computer program product for determining a time difference of arrival of a signal received at two or more receiving sites, comprising:

a computer usable medium having computer readable program code modules embodied in the medium for determining the time difference of arrival;

a computer readable first program code module operating in the frequency domain for transforming the signal received at the first site to a frequency domain representation comprising first component signals each first component signal having a frequency and a phase angle parameter and transforming the signal received at the second site to a frequency domain representation comprising second component signals each second component signal having a frequency and a phase angle parameter;

a computer readable second program code module operating in the frequency domain for determining a Hermitian product of first and second component signals having a same frequency parameter, wherein a frequency parameter of the Hermitian product comprises the same frequency component;

a computer readable third program code module operating in the frequency domain, for determining a phase angle parameter of each Hermitian product;

a computer readable fourth program code module for determining a relationship between the phase angle parameter and the frequency parameter for a plurality of Hermitian products; and a computer readable fifth program code module for determining the time difference of arrival from the relationship.

\* \* \* \* \*